United States Patent
Mortensen et al.

(10) Patent No.: US 11,915,530 B2
(45) Date of Patent: Feb. 27, 2024

(54) WHEEL END MONITORING APPARATUS, FASTENER, AND METHOD

(71) Applicant: Consolidated Metco, Inc., Vancouver, WA (US)

(72) Inventors: Benjamin Mortensen, Camas, WA (US); Brian Bove, Portland, OR (US); Kaustubh Deshmukh, Hillsboro, OR (US); Timothy James Reddington, II, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 441 days.

(21) Appl. No.: 17/065,985

(22) Filed: Oct. 8, 2020

(65) Prior Publication Data

US 2021/0110620 A1    Apr. 15, 2021

Related U.S. Application Data

(60) Provisional application No. 62/912,955, filed on Oct. 9, 2019.

(51) Int. Cl.
  G01M 17/013 (2006.01)
  G07C 5/00 (2006.01)
  (Continued)

(52) U.S. Cl.
  CPC ........... G07C 5/008 (2013.01); G01M 17/013 (2013.01); G07C 5/0816 (2013.01);
  (Continued)

(58) Field of Classification Search
  CPC .... G07C 5/008; G07C 5/0816; G07C 5/0808; G01M 17/013; H02K 7/1846; B60B 3/16;
  (Continued)

(56) References Cited

U.S. PATENT DOCUMENTS 2,600,029 A    6/1952    Rivington
2,747,454 A    5/1956    Bowersett
(Continued)

FOREIGN PATENT DOCUMENTS

CA    2957894 C    2/2019
CN    1375407 A    10/2002
(Continued)

OTHER PUBLICATIONS

Checkpoint Medium Arrow®; Technical Data Sheet from www.checkpoint-safety.com; publicly available before Oct. 9, 2019; 2 pages.
(Continued)

*Primary Examiner* — Freddie Kirkland, III
(74) *Attorney, Agent, or Firm* — Fitch, Even, Tabin & Flannery LLP

(57) ABSTRACT

In one aspect, a wheel end monitoring apparatus comprising a wheel hub configured to receive a wheel rim and be clamped therewith. The wheel end monitoring apparatus further includes a power source, at least one sensor, and communication circuitry that are rotatable with the wheel hub. The at least one sensor is configured to detect at least one property of the clamped wheel hub and the wheel rim. The at least one property is indicative of the clamping of the clamped wheel hub and the wheel rim. The communication circuitry is configured to wirelessly communicate data associated with the at least one property to an external device.

32 Claims, 9 Drawing Sheets

(51) Int. Cl.
  *G07C 5/08* (2006.01)
  *H02K 7/18* (2006.01)
  *B60B 3/16* (2006.01)
  *B60B 27/00* (2006.01)

(52) U.S. Cl.
  CPC .............. *H02K 7/1846* (2013.01); *B60B 3/16* (2013.01); *B60B 27/0015* (2013.01); *B60B 27/0068* (2013.01)

(58) Field of Classification Search
  CPC ............ B60B 27/0015; B60B 27/0068; B60B 2900/3312; B60B 2900/3316
  See application file for complete search history.

(56) References Cited

U.S. PATENT DOCUMENTS

| | | |
|---|---|---|
| 3,823,639 A | 7/1974 | Liber |
| 4,021,690 A | 5/1977 | Burton |
| 4,157,530 A | 6/1979 | Merz |
| 4,333,351 A | 6/1982 | Bickford |
| 4,529,961 A | 7/1985 | Nishimura |
| 4,761,577 A | 8/1988 | Thomas |
| 4,904,132 A | 2/1990 | Popenoe |
| 5,440,184 A | 8/1995 | Samy |
| 5,757,084 A | 5/1998 | Wagner |
| 5,828,135 A | 10/1998 | Barrett |
| 5,945,665 A | 8/1999 | Hay |
| 6,149,244 A | 11/2000 | Wagner |
| 6,204,771 B1 | 3/2001 | Ceney |
| 6,358,051 B2 | 3/2002 | Lang |
| 6,358,061 B1 | 3/2002 | Regnier |
| 6,398,395 B1 | 6/2002 | Hyun |
| 6,490,935 B1 | 12/2002 | Joki |
| 6,535,135 B1 | 3/2003 | French |
| 6,617,968 B1 | 9/2003 | Odisho |
| 6,675,640 B2 | 1/2004 | Ehrlich |
| 7,034,711 B2 | 4/2006 | Sakatani |
| 7,369,966 B1 | 5/2008 | Scelsi |
| 7,412,898 B1 | 8/2008 | Smith |
| 7,466,049 B1 | 12/2008 | Vancea |
| 7,703,669 B2 | 4/2010 | Amirehteshami |
| 7,994,901 B2* | 8/2011 | Malis ................ B60B 3/16 340/426.33 |
| 8,131,420 B2 | 3/2012 | Lynch |
| 8,448,520 B1 | 5/2013 | Baroudi |
| 8,540,468 B2 | 9/2013 | Mekid |
| 8,683,869 B2 | 4/2014 | Herley |
| 8,695,432 B2 | 4/2014 | Hsieh |
| 8,707,776 B2 | 4/2014 | Fischer |
| 8,836,503 B2 | 9/2014 | Gelvin |
| 8,978,967 B2 | 3/2015 | Gamboa |
| 9,947,151 B2* | 4/2018 | Ellis ................ B60C 5/005 |
| 9,978,190 B2 | 5/2018 | Lopes |
| 11,149,777 B2* | 10/2021 | Madru ................ G01B 11/16 |
| 11,247,637 B1* | 2/2022 | Angelillo ................ B60R 25/40 |
| 2002/0033638 A1 | 3/2002 | Okada |
| 2003/0093188 A1 | 5/2003 | Morita |
| 2004/0105602 A1 | 6/2004 | Mizutani |
| 2005/0047692 A1 | 3/2005 | Niebling |
| 2007/0018837 A1 | 1/2007 | Mizutani |
| 2007/0215032 A1 | 9/2007 | Melberg |
| 2008/0117036 A1 | 5/2008 | Kenny |
| 2009/0096599 A1 | 4/2009 | Kranz |
| 2009/0207008 A1 | 8/2009 | Malis |
| 2009/0284362 A1 | 11/2009 | Wilson |
| 2010/0050778 A1* | 3/2010 | Herley ................ F16B 31/02 73/761 |
| 2010/0135604 A1 | 6/2010 | Ozaki |
| 2011/0181393 A1* | 7/2011 | Tillotson ................ F16B 31/02 73/761 |
| 2011/0291467 A1 | 12/2011 | Severini |
| 2013/0044972 A1 | 2/2013 | Ohtsuki |
| 2014/0070935 A1 | 3/2014 | Wang |
| 2014/0309860 A1 | 10/2014 | Paulin |
| 2015/0210350 A1 | 7/2015 | Biderman |
| 2015/0292996 A1 | 10/2015 | Hsieh |
| 2015/0336527 A1 | 11/2015 | Ghannam |
| 2015/0352911 A1 | 12/2015 | Bittlingmaier |
| 2016/0076948 A1 | 3/2016 | Hössle |
| 2016/0281854 A1 | 9/2016 | Tsiberidis |
| 2017/0206720 A1 | 7/2017 | Ellis |
| 2017/0261450 A1 | 9/2017 | Baarman |
| 2018/0019636 A1 | 1/2018 | Roberts |
| 2018/0118158 A1 | 5/2018 | Davis |
| 2018/0202480 A1 | 7/2018 | Kumar |
| 2018/0372769 A1 | 12/2018 | Gunji |
| 2019/0023118 A1 | 1/2019 | Van Der Wal |
| 2019/0249706 A1* | 8/2019 | Hess ................ F16B 31/025 |
| 2020/0130435 A1 | 4/2020 | Root |
| 2020/0161898 A1 | 5/2020 | Seibert |
| 2020/0164704 A1 | 5/2020 | Ciocia |
| 2020/0238755 A1 | 7/2020 | Carr |
| 2023/0122440 A1 | 4/2023 | Carr |

FOREIGN PATENT DOCUMENTS

| | | |
|---|---|---|
| CN | 1412564 A | 4/2003 |
| CN | 101420134 A | 4/2009 |
| CN | 102267336 A | 12/2011 |
| CN | 102738921 A | 10/2012 |
| CN | 102781768 A | 11/2012 |
| CN | 104254699 A | 12/2014 |
| CN | 204858841 U | 12/2015 |
| CN | 105667303 A | 6/2016 |
| CN | 106715163 A | 5/2017 |
| CN | 206490517 U | 9/2017 |
| CN | 108233588 | 6/2018 |
| CN | 108496294 A | 9/2018 |
| CN | 110022035 A | 7/2019 |
| CN | 10789658 A | 2/2020 |
| CN | 111245121 A | 6/2020 |
| CN | 212649239 U | 3/2021 |
| DE | 102004003106 A1 | 9/2004 |
| DE | 102005055597 A1 | 5/2007 |
| DE | 102013216925 A1 | 3/2014 |
| DE | 102013214580 A | 1/2015 |
| DE | 102014218370 A1 | 3/2016 |
| DE | 102015216576 A1 | 3/2017 |
| DE | 202018004013 U1 | 9/2018 |
| EP | 1267474 A2 | 12/2002 |
| EP | 1942316 | 7/2008 |
| EP | 3043083 A1 | 7/2016 |
| FR | 2669728 A1 | 5/1992 |
| JP | 2008239024 A | 10/2008 |
| JP | 2009005430 | 1/2009 |
| KR | 101389218 B1 | 4/2014 |
| TW | 201734335 A | 10/2017 |
| WO | 2015010693 A1 | 1/2015 |
| WO | 2016040763 A2 | 3/2016 |
| WO | 2017072143 A1 | 5/2017 |
| WO | 2017073646 A1 | 5/2017 |
| WO | 2017174646 A1 | 10/2017 |
| WO | 2018030942 A1 | 2/2018 |
| WO | 2019060728 A1 | 3/2019 |
| WO | 2019213702 | 11/2019 |
| WO | 2019213702 A1 | 11/2019 |

OTHER PUBLICATIONS

DTI SmartBolts; DTI Visual Indication System™ product guide printed from Wayback Machine Archive dated Sep. 13, 2019 of http:www.smartbolts.com; 5 pages.

Faraday's law of induction definition from Wikipedia printed from Wayback Machine https://en.wikipedia.org/wiki/Faraday's_law_of_induction dated Sep. 23, 2018; 11 pages.

Safewheel@; Technical Data Sheet from www.checkpoint-safety.com; publicly available before Oct. 9, 2019; 2 pages.

Salisbury, Mark; New Technology Launched Offering World First in Heavy Fleet Wheel and Tyre Security from https://www.fleetpoint.org/fleet-management-2/new-technology-launched-offering-world-first-in-heavy-fleet-wheel-and-tyre-security/; Nov. 27, 2018; 5 pages.

(56) References Cited

OTHER PUBLICATIONS

Squirrel®; Technical Data Sheet from www.checkpoint-safety.com; publicly available before Oct. 9, 2019; 2 pages.
Valley Forge & Bolt Mfg. Co. website printed from Wayback Machine Archive dated Oct. 31, 2018 of https://www.vfbolts.com; 11 pages.
International Search Report and Written Opinion from corresponding PCT Application No. PCT/US2020/054827 dated Dec. 28, 2020; 10 pages.
Extended European Search Report from related European Application No. 20874055.5 dated Oct. 11, 2023; 14 pages.
Chinese Office Action from Chinese Application No. 201980076698.6 dated Oct. 13, 2022, with English translation; 26 pages.
Grant Search Report from Chinese Application No. 201980076698.6 dated Sep. 19, 2023; 3 pages.
Canadian Office Action from related Canadian Patent Application No. 3,155,879 dated Nov. 29, 2023; 10 pages.

* cited by examiner

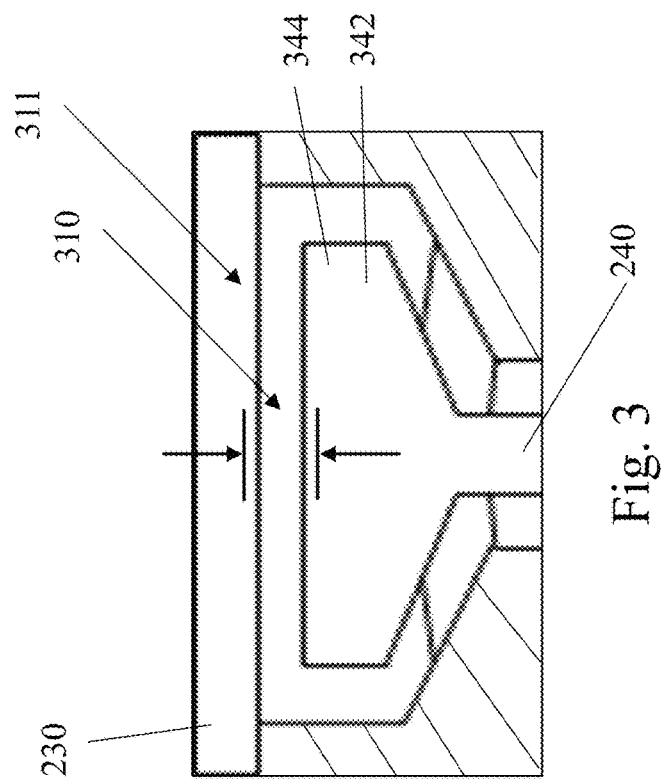
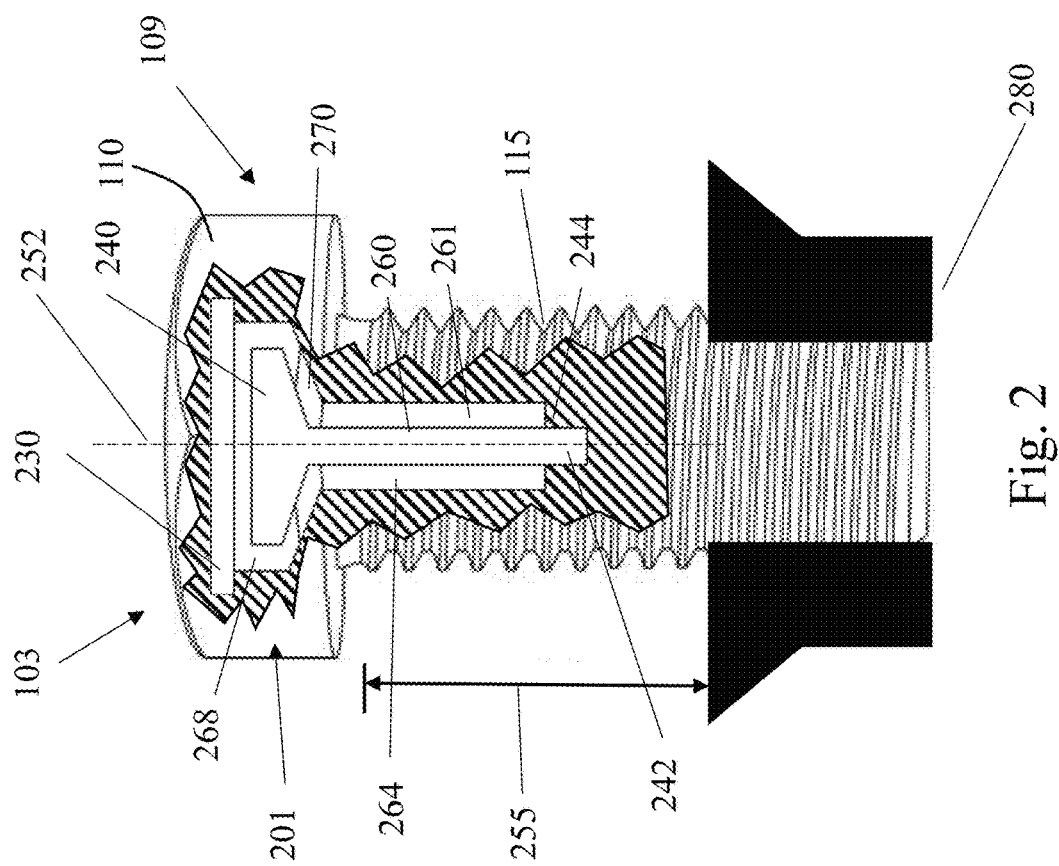

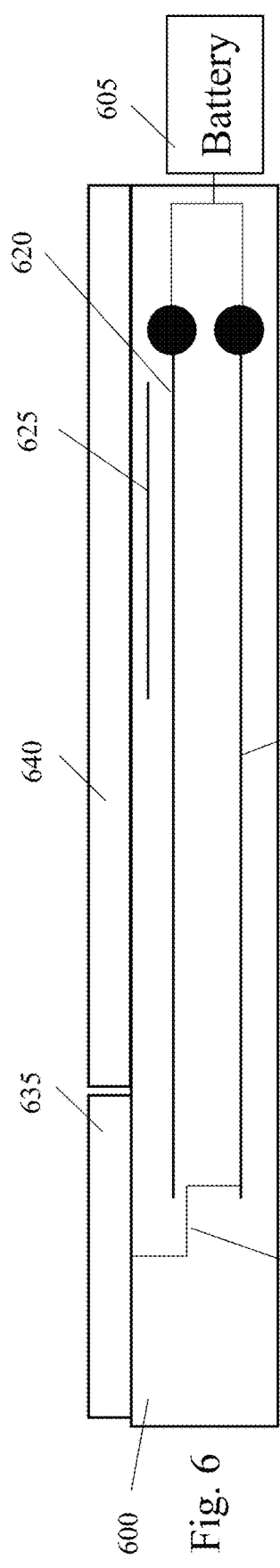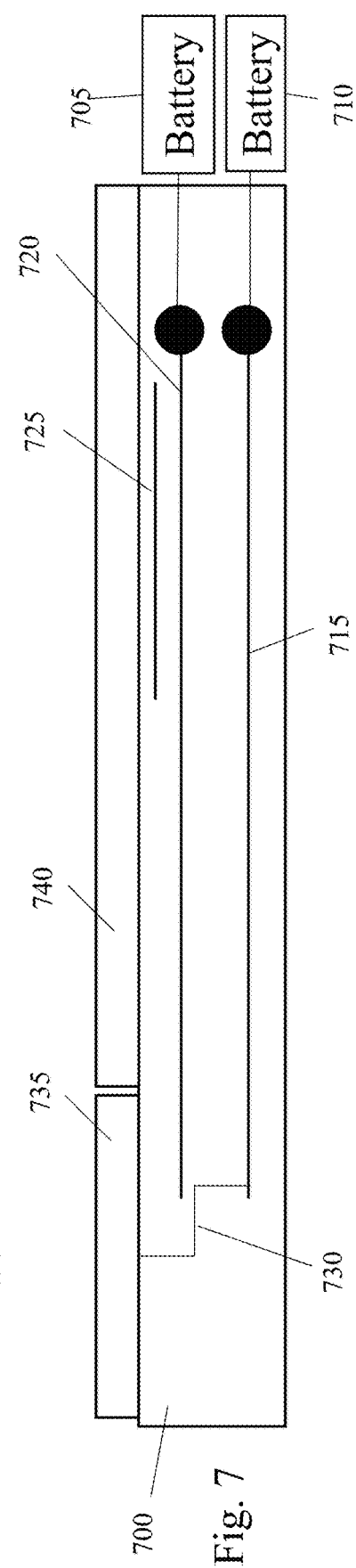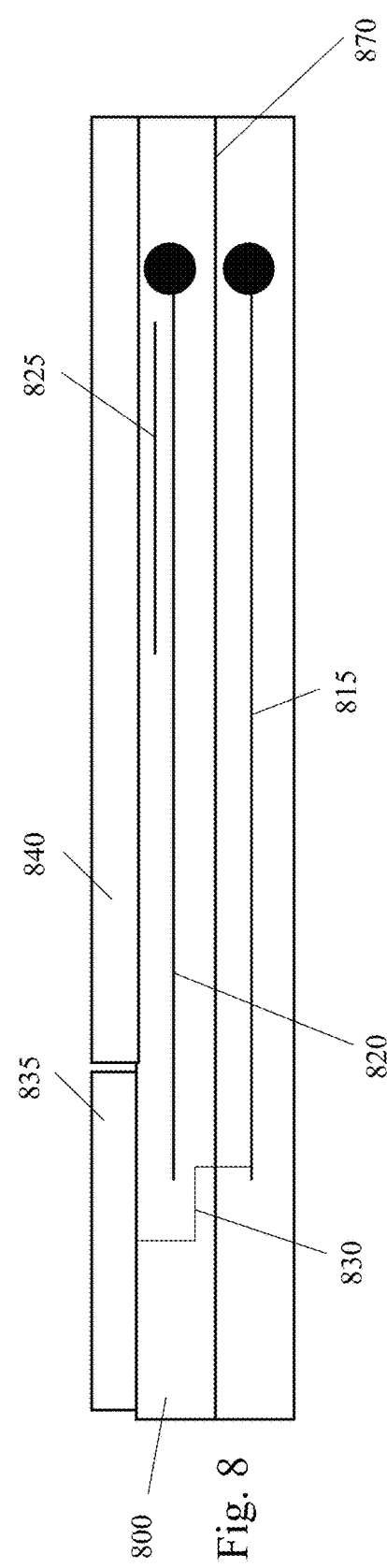

WHEEL END MONITORING APPARATUS, FASTENER, AND METHOD

CROSS-REFERENCE TO RELATED APPLICATION

This application claims the benefit of U.S. Provisional Application No. 62/912,955, filed Oct. 9, 2019, which is hereby incorporated herein by reference in its entirety.

FIELD

This disclosure relates to vehicle wheel ends and, more specifically, relates to monitoring of clamped components of wheel ends.

BACKGROUND

Fasteners, such as screws, bolts, and studs, are used to form joints between objects. The objects are held together by tension created within the fastener. If the tension is released (e.g., if a nut on a stud loosens) the objects may separate and joint failure may result. In commercial trucking, for example, studs are used to join wheels, which include a wheel rim and one or more tires, to wheel hubs. Specifically, a wheel is positioned onto the studs of a hub, lug nuts are engaged with the studs, and the lug nuts are torqued down to secure the wheel to the hub. The process of applying torque to the nuts tensions the studs and causes the shanks or bodies of the studs to elongate slightly.

The torque applied to the lug nuts of a commercial truck, and the resulting tension in the studs, is important to providing a durable construct of the wheel and hub. If the tension is too low, the wheel may disconnect or progressive failures may occur such as wear of mating surfaces, wear of pilots of the hub, and/or stud fatigue. If the tension is too high, the studs of the hub may yield and/or break. Further, excessive stud tension may result in undesirable stress in the hub.

The tension in the studs of a commercial vehicle hub may be too high or too low due to the initial torque applied when installing the wheel onto the hub. In other situations, the tension in the studs may change over time despite the lug nuts tightened down with the appropriate amount of torque. There are numerous environmental factors that may cause the tension in the studs to release over time including, for example, vibration, impact, and temperature change.

Stud tension indicating systems are available that permit a driver or fleet operator to monitor stud tension. For example, in the case of heavy-duty truck wheel-ends, some systems include nut rotation indicators that permit a driver to visually identify changes in the rotational orientation of the nuts of a wheel hub which would indicate a loss of stud tension. More specifically, if any of the nuts on the wheel loosens, the nut rotation indicator will become noticeably out of alignment with the other nut rotation indictors on the wheel. The driver is thereby alerted to a potential loss in tension in the stud due to the loosened nut on the stud. However, these nut rotation indicators are unable to provide a driver or fleet operator with real-time tension information during operation of the vehicle. These nut rotation indicators do not indicate a specific value of tension. Further, these nut rotation indicators are unable to alert a driver if a stud of the wheel hub has yielded and has begun to deform plastically, which may occur due to over-tightening of the associated nut.

SUMMARY

In accordance with one aspect of the present disclosure, a wheel end monitoring apparatus is provided for a vehicle. The wheel end monitoring apparatus comprises a wheel hub configured to receive a wheel rim and be clamped therewith. The wheel hub may include, for example, a wheel hub body, studs, and nuts. The wheel end monitoring apparatus further includes a power source, at least one sensor, and communication circuitry that are rotatable with the clamped wheel hub and wheel rim. The at least one sensor is configured to detect at least one property of the clamped wheel hub and the wheel rim. The at least one property is indicative of the clamping of the clamped wheel hub and the wheel rim. The communication circuitry is configured to wirelessly communicate data associated with the at least one property to an external device. The data communicated by the communication circuitry may include, for example, a signal (e.g., a voltage) output from a transducer of the at least one sensor, the at least one property of the clamped wheel hub and wheel rim, an alert, and/or a conclusion drawn from the at least one property such as a predicted lifespan of a wheel hub component. In this manner, the wheel end monitoring apparatus may facilitate real-time monitoring of the clamped wheel hub and the wheel rim by an in-vehicle system and/or a remote cloud-based computing system while the wheel hub and wheel rim are at rest or rotating during operation of the vehicle.

Further, the external device may include a gateway of the vehicle. The wireless communication from the communication circuitry to the external device may be a short-range wireless communication that requires a limited power consumption. The gateway may be connected to an electrical system of the vehicle and utilize electrical power from the vehicle to power a long-range wireless communication to a wide area wireless network, such as a cellular phone network. The gateway thereby permits the power provided by the power source to be minimized by receiving the data from the communication circuitry via a short-range wireless signal and transmitting the data to the wide area wireless network using power from the vehicle.

In one embodiment, the power source is configured to harvest power from rotation of the wheel hub. For example, the vehicle spindle may have magnets mounted thereto and the power source includes a coil mounted on the wheel hub that rotates through magnetic fields of the magnets as the wheel hub rotates around the vehicle spindle. The changing magnetic fields acting on the coil induces electrical energy to flow in the coil. The power source may include a battery for storing harvested electrical energy and a power supply circuit that supplies power to the sensor and communication circuitry. The power source thereby provides a source of electrical power on-board the wheel hub for use by the at least one sensor and the communication circuitry.

In another aspect, a wheel end monitoring apparatus is provided that includes a wheel hub having a mounting portion and a plurality of studs of the wheel hub projecting from the mounting portion to mount a wheel rim to the wheel hub. The wheel end monitoring apparatus includes nuts of the wheel hub configured to threadingly engage the studs and clamp the wheel rim and wheel hub mounting portion together. The studs have sensors operably coupled to a power source of the wheel hub, the sensors configured to detect at least one property of the studs indicative of the clamping of the wheel rim and the wheel hub. Because the studs are placed in tension during clamping of the wheel rim and the wheel hub, the at least one property of the studs may be a highly accurate source for one or more properties of the clamp between the wheel rim and the wheel hub. The wheel end monitoring apparatus further comprises communication circuitry configured to communicate data associated with the at least one property to an external device, such as a gateway of a vehicle.

A fastener is also provided that includes a fastener housing having a head and a body. The body of the fastener housing elongates upon tension of the body. The fastener housing has an internal compartment and a displacement member in the internal compartment. The displacement member shifts upon tensioning of the body. The fastener further includes a capacitive sensor in the internal compartment configured to detect a capacitance between the capacitive sensor and the displacement member. The capacitance changes as the displacement member shifts with tensioning of the body. The fastener further includes communication circuitry operably coupled to the capacitive sensor and configured to communicate data associated with the capacitance to a remote device. The fastener may be used in a variety of applications, such as a stud of a wheel hub, a fastener used to secure a brake rotor to a wheel hub, or a fastener used to connect a drive axle to a wheel hub.

In accordance with another aspect, a method is provided for monitoring the wheel end components of a vehicle. The wheel end components comprise a wheel hub and a wheel rim that are clamped together. The method includes powering at least one sensor associated with the wheel end components via a power source. The at least one sensor and power source are rotatable with the wheel end components. The method further includes detecting, via the at least one sensor, at least one property indicative of clamping between the clamped wheel hub and wheel rim. The method further includes wirelessly communicating, via communication circuitry associated with the wheel end components and rotatable therewith, data associated with the at least one property to at least one external device. In this manner, the method facilitates monitoring of at least one property of rotatable, clamped components of a wheel end using a sensor, power source, and communication circuitry that are on-board the clamped components.

BRIEF DESCRIPTION OF THE DRAWINGS

FIG. 2 illustrates a stud having a nut at one end.

FIG. 3 illustrates an air gap created between a printed circuit board and a displacement pin of the stud of FIG. 2.

FIGS. 6, 7 and 8 illustrate example printed circuit board architectures.

DETAILED DESCRIPTION

Figure 1:
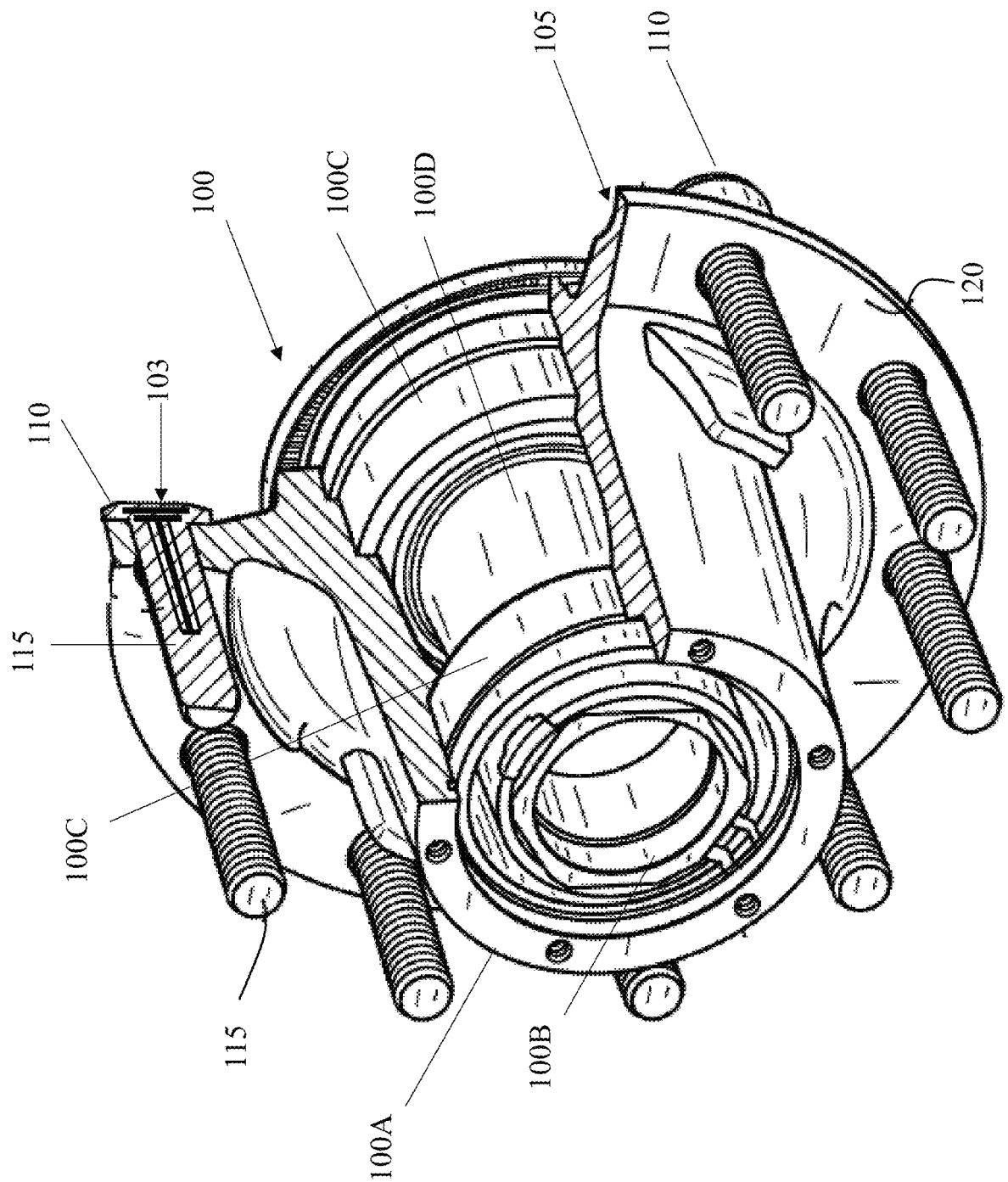
FIG. 1 illustrates a wheel hub having a plurality of studs.

In accordance with one aspect of the present disclosure, a fastener monitoring apparatus is provided that allows for the digital determination of one or more properties of one or more fasteners of a joint between, for example, a wheel hub and a wheel, as well as the ability to deliver data regarding the one or more fastener properties wirelessly to a user. The one or more fastener properties may include, for example, tension, strain, torque, and/or length. The fastener monitoring apparatus may simplify pre-trip inspections as well as installation quality verification.

The fastener monitoring apparatus may utilize the one or more properties of the one or more fasteners to determine, or facilitate a determination by a remote computer, a current or predicted failure mechanism of the construct of the wheel and the wheel hub. For example, the fastener monitoring apparatus may detect a yielded stud failure mode wherein the material of a stud has yielded due to the stud stretching too far. As another example, the fastener monitoring apparatus may detect an under-tensioned or over-tensioned stud and provide an early warning system for wheel-offs, progressive failures of the fasteners, broken fasteners, and high hub stress. The fastener monitoring apparatus permits determination of one or more properties of the fastener at the associated vehicle or remotely, including during operation of the vehicle, thus improving maintenance planning and helping to avoid unplanned downtime.

In one embodiment, the fastener monitoring apparatus includes a stud with embedded electronics designed to measure the tension on the stud. Such measurements may be communicated wirelessly to a local device, such as a handheld device or vehicle electronic control unit (ECU), or to a remote computer. This communication may be direct, indirectly via a local mesh network, and/or indirectly over a wide area network as some examples.

In one embodiment, the fastener monitoring apparatus includes a plurality of studs of a wheel hub of a commercial truck and may communicate with the vehicle driver and/or the fleet manager through one or more other devices. For example, the studs may replace traditional wheel studs in class 8 vehicles, or in any private or fleet truck. In other embodiments, the fastener monitoring apparatus may be utilized in place of traditional fasteners in a variety of applications. For example, the fastener monitoring apparatus may be utilized with heavy equipment, power generation and distribution equipment, wind turbine equipment, and/or mining equipment. The fastener monitoring apparatus may also be utilized in different components of a commercial vehicle, such as studs used to connect a brake rotor to a wheel hub and/or studs used to connect a drive axle to a wheel hub.

In one method of utilizing the fastener monitoring apparatus, a driver receives an alert if the tension of any monitored fastener of the vehicle is beyond a specified threshold. For example, the tension in a stud may be beyond a lower threshold when a nut of the stud has loosened. As another example, the tension in the stud may be beyond an upper threshold when the tension approaches a tension that may cause the stud to yield. The driver may then take action to correct the problem, e.g. using a wrench to apply torque to the nut associated with the stud. Alternatively, the fasteners of a vehicle may be queried on-demand to provide tension data as requested by an external system, a driver and/or a fleet mechanic.

In one embodiment, the fastener monitoring apparatus includes a wheel stud that measures, digitizes, and transmits data regarding elongation of a body of the stud. The stud includes a displacement pin within the stud body and having a lower end portion fixed to the stud body. Prior to wheel installation, the displacement pin is at a predetermined depth in the stud. For example, the displacement pin may be in direct contact with or adjacent to a printed circuit board located in a head of the stud. The stud body includes threads onto which a nut is threaded. In one embodiment, a flange of a wheel hub and a portion of the wheel rim are clamped between the stud head and a nut threadingly engaged with the stud body.

As the nut is torqued onto the stud body, the stud body stretches elastically until the nut reaches a predetermined torque and the stud is subjected to an associated tension. This tension elongates the stud body based on the elastic modulus of the material of the stud body. Because the lower end portion of the displacement pin is fixed to the stud body, the elongation of the stud body shifts the displacement pin within the stud body away from the printed circuit board a distance proportional to the applied torque. This separation creates or enlarges a gap between an upper capacitor plate portion of the printed circuit board and a lower capacitor plate portion of the displacement pin. The capacitance C between the upper capacitor plate portion and the lower capacitor plate portion may be estimated using the general parallel plate capacitance equation:

$$C = \frac{\varepsilon \times A}{d}$$

Wherein $\varepsilon$ is the permittivity of the dielectric between the two plates, A is the area of the upper and lower capacitor plate portions, and d is the distance between the upper and lower capacitor plate portions. Air is one medium that may be used for capacitance measurement. Other mediums may include other dielectrics or combinations of dielectrics.

The change in capacitance corresponding to the change in air gap is used to determine the change in distance between the upper and lower capacitor plate portions. This change of distance corresponds to an elongation or change in length of the stud body. A processor, which may be a component of or external to the stud, may thereby determine the strain in the stud by dividing the change in length of the stud body by the length of the stud body. The processor may further determine the tension in the stud using the determined strain, Young's modulus of the stud material, and cross-sectional area of the stud. As one example, the processor may utilize a look-up table containing experimentally derived strain values for different materials and sizes of studs as well as associated capacitance values. Thus, for a given type of stud and detected capacitance, the processor may look up and/or interpolate the strain from the table.

As another example, the following general capacitance equation may be used to convert detected capacitance to a tension value:

$$C = \frac{\varepsilon A_c}{d} = \frac{k\varepsilon_0 A_c}{d} \quad (1)$$

Where:
C=capacitance between two plates
$\varepsilon$=permittivity of material between the two plates
k=dielectric constant of the material between the two plates
$\varepsilon_0$=permittivity of free space=$8.854e^{-12}$ $Fm^{-1}$
$A_c$=Overlapping area of capacitor plates
d=Distance between plates The general capacitance equation (1) may be rearranged to solve for the distance between the plates:

$$d = \frac{k\varepsilon_0 A_c}{C}$$

The Young's modulus of the stud material, E is defined as, $$E = \frac{\text{Stress}}{\text{Strain}}$$

$$E = \frac{\left(\frac{F}{A_S}\right)}{\left(\frac{\Delta l}{L}\right)}$$

where,
F=Tension in the stud
$A_s$=Cross-sectional area of stud
$\Delta l$=Change in length of stud
L=Original length of stud The change in length of the stud produces a change in gap at the capacitor plates. Assuming zero initial gap, $\Delta l = d$. Substituting and re-arranging the Young's modulus equation results in:

$$E = \frac{FL}{A_s d}$$

The tension in the stud is given by:

$$F = \left(\frac{A_s E}{L}\right) d$$

Substituting for d from the general capacitance equation (1) above, the tension (F) in the stud may be determined using the following equation:

$$F = \left(\frac{A_s E}{L}\right) \times \left(\frac{k\varepsilon_0 A_c}{C}\right)$$

Rearranging the equation results in the following equation that may be used to obtain a tension value from the detected capacitance:

$$F = \left(\frac{A_s A_c E k \varepsilon_0}{L}\right) \times \frac{1}{C} \quad (2)$$

The term in brackets in equation (2) may be a constant for a given application. Thus, the tension value in the stud may be determined based on a detected capacitance and the physical characteristics of the stud.

In one embodiment, the printed circuit board is configured to detect and digitize the change in capacitance across the air gap (or other dielectric(s)) between the upper and lower capacitor plate portions) generated by stud stretch. Changes in the stud tension and the resultant air gap between capacitor plate portions of the printed circuit board and displacement pin are captured as changes in electronic capacitance. This data reading can then be transmitted from the stud to a client, cloud, or end user via communication circuitry of the stud.

With reference to FIG. 1, a wheel hub 100 is illustrated and includes components for connecting a wheel rim to a spindle of a vehicle. The wheel hub 100 may include a wheel hub body 100A, studs 103, a spindle nut 100B, roller bearing assemblies 100C, and a spacer 100D. The roller bearing assemblies 100C may each include an inner race, an outer race, and roller bearings that roll along the inner and outer races with rotation of the wheel hub 100.

The wheel hub 100 is configured to receive a wheel and join the wheel to the wheel hub using studs 103. The studs 103 each have a head portion, such as head 110 and a shank or body portion, such as stud body 115. A wheel is placed onto the studs 103 and fastened in place by screwing a nut onto each of the stud bodies 115 until the wheel is secured tightly in place between the nut and a front surface 120 of a mounting portion, such as a flange 105, of the wheel hub 100.

FIG. 2 illustrates one such stud 103. The stud 103 has a stud housing 109 including the head 110 and the stud body 115. When a nut 280 is tightened onto the body 115 of the stud 103, the body 115 has a deformable portion 255 that extends along an axis 252 between the head 110 and the nut 280. The stud 103 includes a sensor 201 configured to detect one or more properties of the stud 103, such as stress, strain, torque, and/or length. The sensor 201 may include a variety of transducers, such as at least one of a capacitive sensor, a strain gauge, an inductive sensor, a hall effect sensor, an electrical transducer, and an optical sensor. All of the studs 103 may include sensors 201, or fewer than all of the studs 103 may include sensors 201.

For example, the sensor 201 may detect the distance that the stud 103, and in particular the stud body 115 thereof, elongates by measuring the capacitance associated with an air gap 310 (see FIG. 3) that is caused by elongation of the study body 115. The stud 103 further includes a printed circuit board 230 and a displacement member, such as a displacement pin 240, to measure how far the stud 103 has stretched. The displacement pin 240 has a distal or lower end portion 242 fixed to the stud body 115. The axial size of the air gap 310 between the printed circuit board 230 and the displacement pin 240 is measured to determine the axial elongation of the stud body 115. The displacement pin 240 includes a proximal, upper head portion 342 with a lower capacitor plate portion 344 adjacent the printed circuit board 230 that interacts with a capacitor plate portion (e.g. capacitor plate portion 615 in FIG. 6) of the printed circuit board 230 to form a capacitor 311. Thus, as the stud body 115 of the stud 103 stretches, the displacement pin 240 shifts axially away from the printed circuit board 230 and the axial length of the air gap 310 is increased. When no tension is applied to the stud 103, the displacement pin 240 may be configured to touch or be closely adjacent to the printed circuit board 230. The displacement pin 240 may be made of, for example, mild steel, the stud 103 may be made of, for example, cold rolled steel, and the nut 280 may be made of, for example, forged steel. It should be appreciated that other materials may be used to form the displacement pin 240, the stud 103, and the nut 280. Nothing is this disclosure should be taken to limit these structures to only the materials discussed above.

Figure 4:
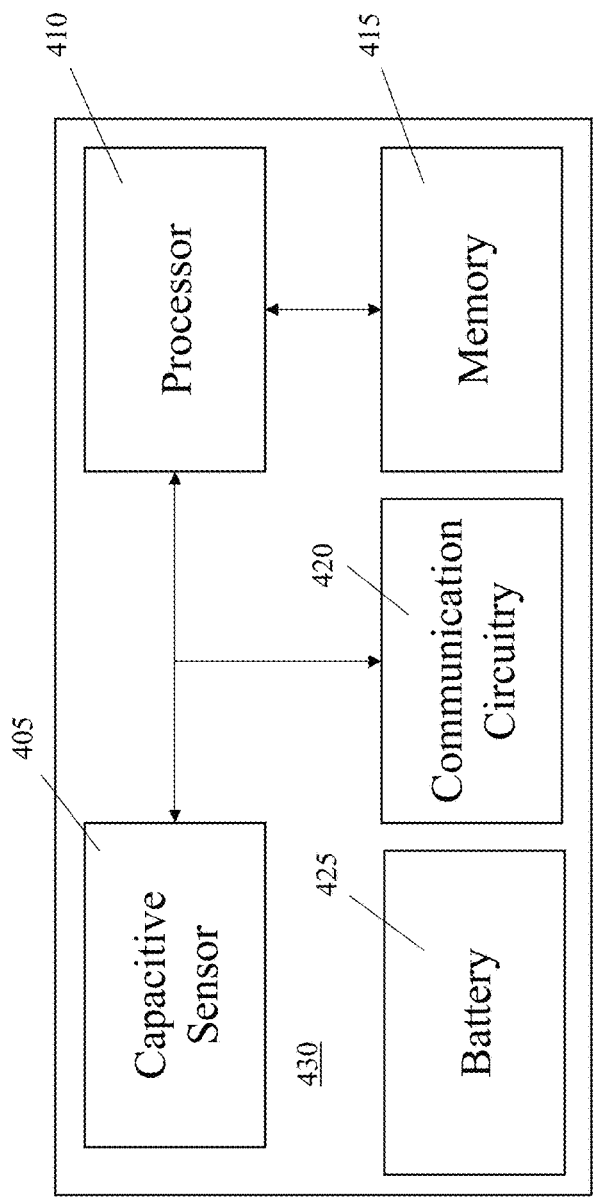
FIG. 4 is a block diagram illustrating an embodiment of the printed circuit board of FIG. 3 having a capacitive sensor and a separate processor.
Figure 5:
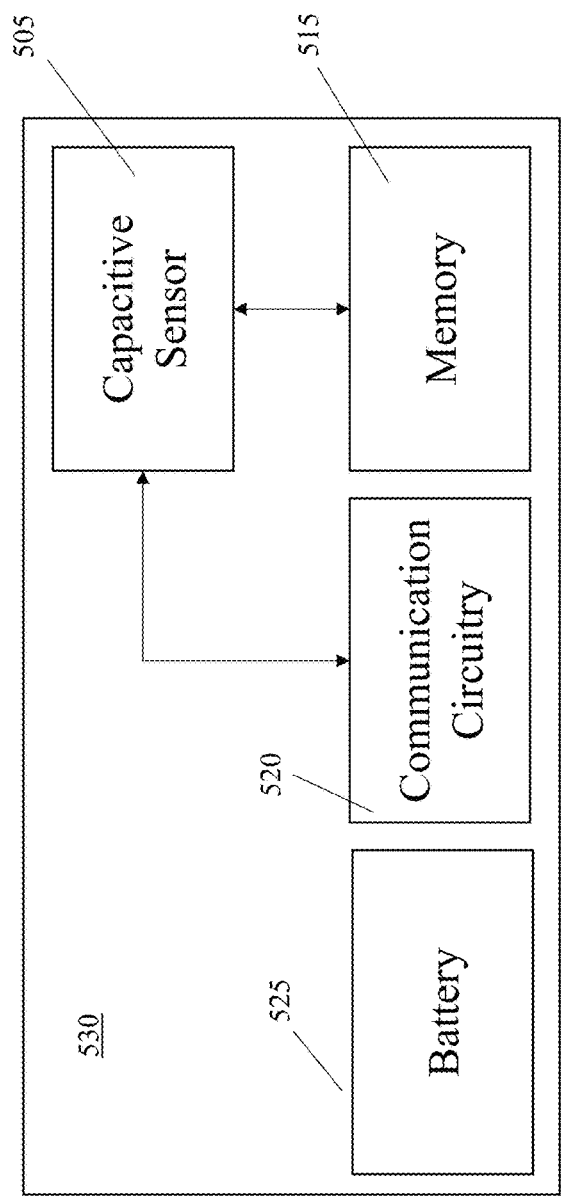
FIG. 5 is a block diagram illustrating an embodiment of the printed circuit board of FIG. 3 having a capacitive sensor without a separate processor.

As illustrated in FIGS. 4 and 5, the printed circuit board 230 may be embodied as the printed circuit board 430 or the printed circuit board 530. The printed circuit board 430 includes, for example, a processor 410 coupled to a memory 415, a capacitive sensor 405, and communication circuitry 420. One or more of the aforementioned components are also coupled to the battery 425. The capacitive sensor 405 may, for example, convert a measured capacitance to a corresponding electric voltage level indicative of the distance between the displacement pin 240 and the capacitive sensor 405. The capacitive sensor 405 may then communicate the voltage level to at least one of the processor 410 and the communication circuitry 420. As will be described in more detail below, the processor 410 may further process the received voltage level and/or store the voltage level in the memory 415. After processing the voltage level, the processor 410 may transmit voltage level data such as the voltage level itself and/or information based on the voltage level (e.g., strain, stress, and/or alerts) via the communication circuitry 420. The communication circuitry 420 may be configured to send and receive data based on one or more communication protocols such as Bluetooth®, Zigbee, Z-wave, 6LowPAN, Thread, WiFi, and/or LoRaWAN as some examples.

The electrical circuit of the printed circuit board 430 may be completed entirely within the printed circuit board 430. This approach may reduce electrical interference for the stud 103. In another embodiment, the electrical circuit of the printed circuit board 430 may include the head 110 and/or body 115 of the stud 103.

The printed circuit board 530 includes, for example, a capacitive sensor 505 coupled to a memory 515 and communication circuitry 520. One or more of the aforementioned components are also coupled to the battery 525. The printed circuit board 530 is similar to the printed circuit board 430 except there is no separate processor on the printed circuit board 530 and the capacitive sensor 505 includes an integrated processor for processing the voltage level data.

Regarding FIGS. 6, 7, and 8, the printed circuit boards 230, 430, 530 may each have one of the configurations of printed circuit boards 600, 700, 800. In FIG. 6, the printed circuit board 600 includes a ground plane 625, a power plane 620, and an upper capacitor plate portion 615. The capacitor sensor 635 and the other circuitry 640, which includes, for example, communication circuitry 420 and processor 410, may be mounted to the printed circuit board 600. The capacitive sensor 635 and the other circuitry 640 may be connected to both the ground plane 625 and the power plane 620. The battery 605 may couple between the power and ground planes 620, 625. The battery 605 may also connect directly to the upper capacitor plate portion 615 of the capacitive sensor 635 directly, or indirectly through the power plane 620. In one embodiment, the capacitive sensor 635 includes a connector 630 that connects the upper capacitor plate portion 615 to one or more other components of the capacitor sensor 635 to allow the capacitive sensor 635 to measure the capacitance between the upper capacitor plate portion 615 and the lower capacitor plate portion 344.

Regarding FIGS. 2 and 3, the lower capacitor plate portion 344 of the displacement pin 240 forms a lower capacitor plate that interacts with the upper capacitor plate portion 615. The surface of the lower capacitor plate portion 344 may be generally circular. The displacement pin 240 tapers down to a cylindrical shaft 260 that includes the end portion 242 embedded in the stud body 115. The end portion 242 of the displacement pin 240 may be attached to the stud body 115 via a press fit engagement, a weld, adhesive, and/or fastener (e.g., a transverse pin) in an inner compartment 264 of the stud 103. In one embodiment, the inner compartment 264 includes a blind bore formed in the stud 103. The head 110 and the body 115 of the stud may be two components that are joined together, such as by welding, or may have a unitary, one-piece construction. The head 110 may include a head portion 268 of the inner compartment 264 and the body 115 may include a body portion 261 of the inner compartment 264. The head portion 268 may have a larger inner diameter than the inner diameter of body portion 261. The head 110 may include a tapered surface, such as a frustoconical surface 270, that provides clearance for the underside of the displacement pin head portion 342 as the displacement pin head portion 342 shifts axially away from the printed circuit board 230 with elongation of the stud body 115. In another embodiment, the displacement pin 240 includes a uniform width throughout and does not include the head portion 342.

Turning to FIG. 7, the printed circuit board 700 is similar to printed circuit board 600 except that the printed circuit board 700 includes a battery 705 and a battery 710. The battery 705 and the other circuitry 740 are connected to the power plane 720 of the printed circuit board 700. The upper capacitor plate portion 715 of the capacitor sensor 735 is connected to the battery 710. The capacitor sensor 735 including the connector 730 and upper capacitor plate portion 715 therefore receive electrical power from a different battery (battery 710) than the other circuitry 740 (battery 705). These parallel power sources may reduce noise in the capacitive measurement.

Turning to FIG. 8, like numbered structures in printed circuit board 800 are identical to the structures described with respect to FIG. 6. Specifically, the printed circuit board 800 includes a capacitive sensor 835, other circuitry 840, power plane 820, connector 830, and upper capacitor plate portion 815. The printed circuit board 800 may connect to batteries in either of the approaches described with respect to FIGS. 6 and 7. FIG. 8 further includes an electrical isolation plane 870 to isolate the components above the isolation plane 870 from any noise created by the components below the isolation plane and vice versa. The connector 830 extends through the isolation plane 830.

In some embodiments, the upper capacitor plate portion 615, 715, 815 is formed on the bottom surface of the printed circuit board 600, 700, 800 near the associated displacement pin 240. The shape of the upper capacitor plate 615, 715, 815 corresponds to the shape of the lower capacitor plate portion 344 of the displacement pin 240 near the printed circuit board 600, 700, 800. For example, the upper capacitor plate portion 615, 715, 815 and the lower capacitor plate portion 344 may each have planar confronting surfaces, or the confronting surfaces may be concave/convex.

Figure 9:
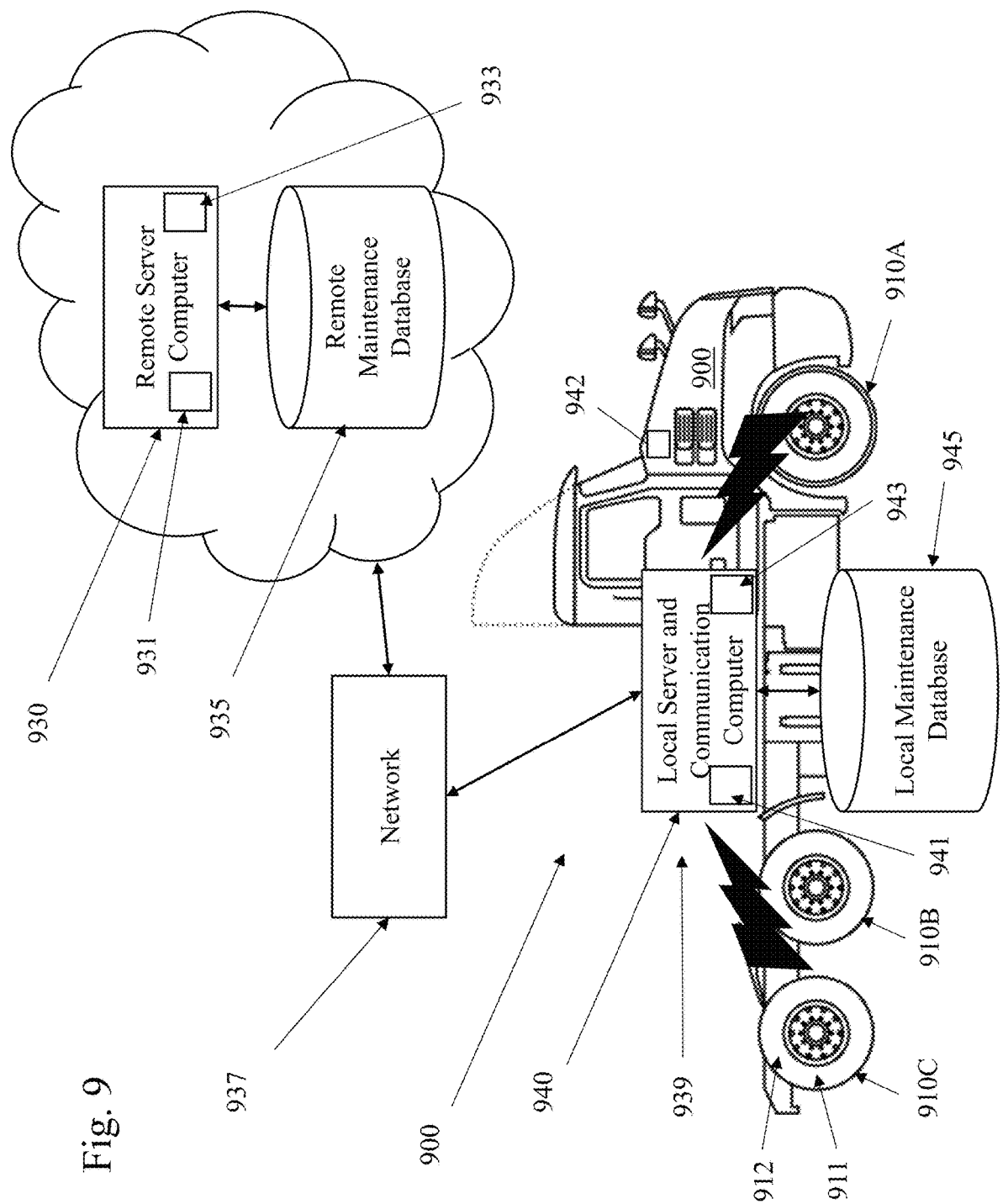
FIG. 9 is a system diagram of a monitoring system implementing the studs of FIG. 2.

Regarding FIG. 9, a system 900 is provided implementing studs 103. Each of the wheels 910A, 910B, and 910C have a wheel rim 911 with one or more tires 912. The wheel rim 911 is joined to a wheel hub of the tractor 900 using studs 103 of the wheel hub. The studs 103 may communicate with an external device such as a gateway 939. The gateway may include a processor 941 and communication circuitry 943. In one embodiment, the gateway 939 includes a local server and computer 940 of the tractor 900. The studs 103 may communicate either directly or indirectly, such as via one or more of the other studs 103 or other ECUs of the tractor 900. For example, the communication may take place according to a mesh network topology.

The studs 103 may rotate with the wheel hubs of the tractor 900 and wirelessly transmit data to the gateway 939 which is stationary relative to the tractor 900. The communication circuitry of the studs 103 may utilize short-range communication protocols, such as Bluetooth, Bluetooth Low Energy, and Zigbee, to communicate with the gateway 939 while minimizing energy consumption. The gateway 939 may communicate with a cloud-based computing network via a wide area network such as cellular (e.g., 3G, 4G, 4G LTE, 5G), WiMax, or LoRaWAN networks as some examples. The gateway 939 may receive electrical power from the electrical system of the tractor 900 so that the long-range communications from the gateway 939 to the network may be performed continuously and/or intermittently as needed for a particular situation. The use of gateway 939 to perform long-range communications preserves the battery life of the studs 103 or, if the studs 103 utilize an inductive energy charging system, reduce the energy requirements of the studs 103.

The local server and communication computer 940 may be configured to receive one or samples or other data such as a warning from the studs 103. The local server and communication computer 940 may display or otherwise notify the user of one or more properties of the studs 103, such as tension, of any of the studs 103. For example, the local server and communication computer 940 may be coupled to a human-machine interface (HMI) 942 and provide stud tension information via a GUI and/or speaker.

Records related to one or more of the studs 103 may be stored in a local maintenance database 945. The local server and communication computer 940 may also communicate any or all of the data from the studs 103 to a remote server computer 930 via network 937 where the data may be processed or stored in a remote maintenance database 935. The remote server computer 930 may include a processor 931 and a communication interface 933. The network 937 may include, for example, a cellular network and the internet. The remote server computer 930 may transmit data such as current tension and/or a warning regarding any of the studs 103, to the local server and communication computer 940. The local server and communication computer 940 may notify a user, including, for example, the driver, about a condition or status of any of the studs 103. Though this exemplary system illustrates the tractor 900 as an example, it should be appreciated that this system may be implemented in any class of vehicle or in any machine where monitoring of fastener tension is desired.

The studs 103 may include a processor, such as processor 410, or a capacitive sensor, such as capacitive sensors 405, 505, operable to sample one or more properties of the stud body 115 via a capacitive sensing module and transmit the sampled data (e.g. tension, distance, strain) via a communication interface, such as communication circuitry 420, 520, at regular intervals. The capacitance detected by the capacitive sensor may be determined according to, for example, a parallel plate equation. The sampling interval and the transmission interval need not be the same. For example, the sampling interval may be more frequent than the transmission interval and, during a given transmission, multiple samples may be sent as a batch. In other embodiments, the processor may average or otherwise statistically process the samples prior to sending the processed data during a given transmission to reduce the size of the data being transmitted and reduce power usage.

The studs 103 may include a processor, such as processor 410, or a capacitive sensor, such as capacitive sensors 405, 505, operable to increase inspection frequency for increased immediate and short-term accuracy. For example, if the detected tension in the stud 103 is changing rapidly or goes above/below an upper/lower threshold, then the processor 410 may increase the rate at which the processor 410 samples the capacitance between the printed circuit board 430 and the displacement pin 240. In such cases, the stud 103 may also increase the rate at which data is transmitted via the communication circuitry 420. If the tension in the stud 103 beings changing less rapidly, the stud 103 may decrease the sampling and transmission intervals. Furthermore, if the tension in the stud 103 varies within a given range centered on the ideal tension for a given application, the stud 103 may ignore (i.e., not change the sampling interval) these changes in tension because the processor 410 recognizes that variation are normal for a given application. For example, if the samples are normally distributed and all of the samples of within an acceptable statistically variance from the mean, the changes in tension may not cause the processor to adjust the sampling rate.

The stud 103 may be programmed to transmit an indication that an appropriate tension has been achieved. For example, when a processor determines that the appropriate tension has achieved, the communication circuitry of the stud 103 may transmit a notification to an external device that the appropriate tension has been achieved. For example, the stud 103 may communicate a "proper torque achieved" message to a maintenance worker's portable electronic device when the maintenance worker has torqued a nut on the stud 103 to the correct torque. In some embodiments, the stud 103 may be configured to automatically pair with a tool for creating tension (e.g. by applying torque to nut 280) and send a communication to the tool when the appropriate tension is achieved. That communication may cause the tool to stop applying torque to the nut 280.

The sampling and transmission rates of the stud 103 may be controlled by external devices via the communication circuitry of the stud 103. For example, an external device may wirelessly couple to the studs 103 and cause the studs 103 to sample the tension on the studs 103. The studs 103 may then report measurements to the external device individually, through a mesh network topography, or through a combination of the two based on power constraints. For example, in the case of a pre-trip inspection, the user of an external device, such as a smartphone, tablet computer, laptop computer, or desktop computer may initiate a pre-trip inspection of vehicle. The external device may cause a signal to be generated that when received by the studs 103 causes the studs 103 to sample the tension thereof. This reporting saves time during pre-trip inspection and reduces delay.

In the event a sampled tension in the stud 103 crosses an emergency threshold, an emergency report may be sent to a user indicating that immediate action is needed. The stud 103 may first attempt communication using its lowest power mode of communication. The stud 103 will increase the power level of communications to the maximum capability thereof until receipt of the emergency communication is acknowledged. The stud 103 may, for example, wait for acknowledgement of receipt of the emergency communication by the local server and communication computer 440 before the stud 103 stops transmitting the emergency communication.

The stud 103 may normally operate in a low-power mode unless the tension in the stud 103 crosses the emergency threshold. For example, the processor 410 may include a primary processor and a secondary processor. The secondary processor determines tension in the stud 103 at predetermined or random intervals. If the tension crosses the emergency threshold, the secondary processor wakes up the primary processor and the primary processor operates the communication circuitry 520 to send the emergency communication.

Figure 10:
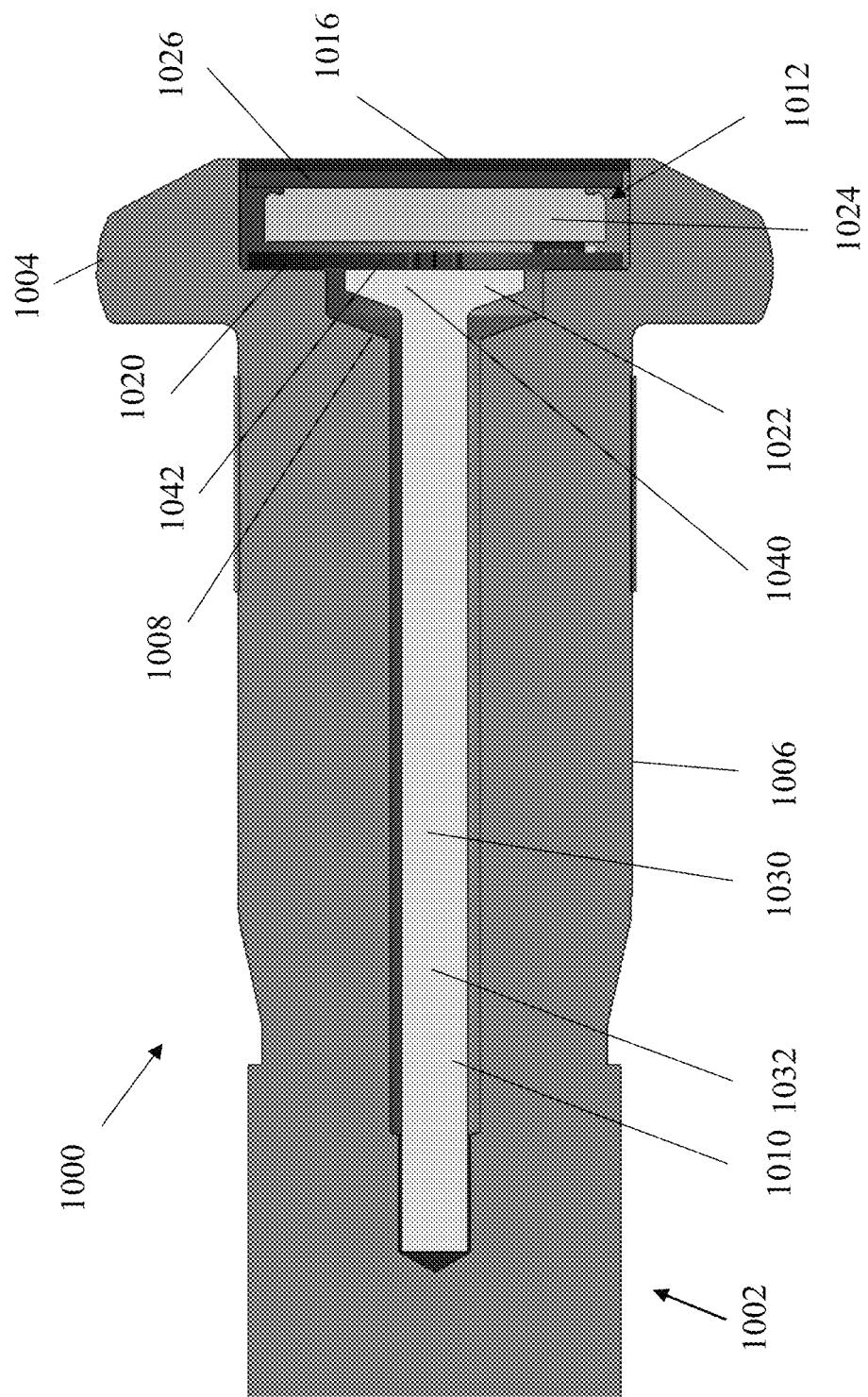
FIG. 10 is a cross-sectional view of a stud having an internal displacement pin and circuitry received in an internal compartment of the stud.
Figure 11:
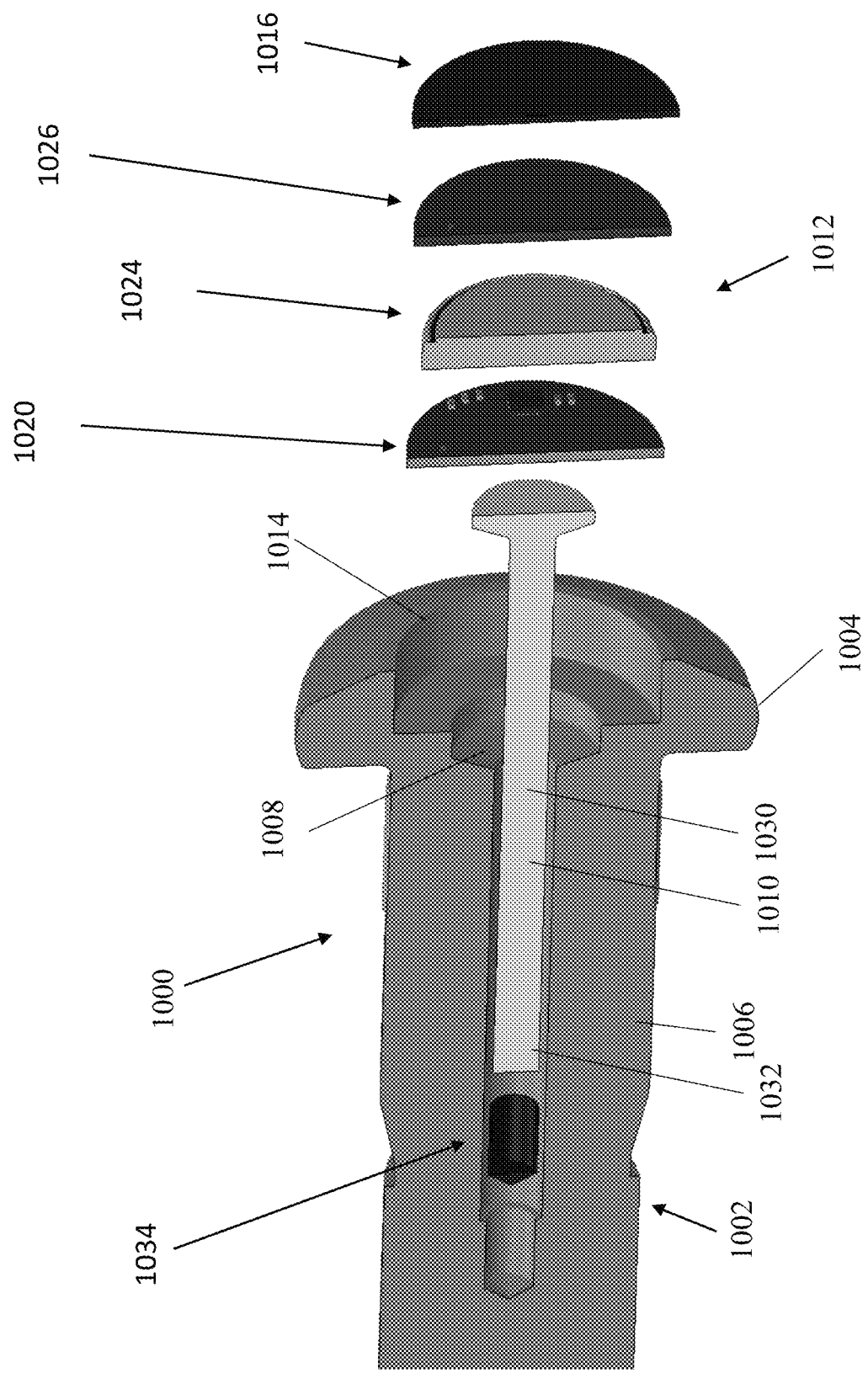
FIG. 11 is an exploded view of the stud of FIG. 10 showing a battery sandwiched between a sensor circuit board and a data communication circuit board of the circuitry of FIG. 10.

Regarding FIGS. 10 and 11, another stud 1000 is provided that is similar in many respects to the stud 103 discussed above. The stud 1000 includes a stud housing 1002 having a head 1004 and a stud body 1006. The stud housing 1002 includes an inner compartment 1008 that receives a displacement pin 1010 and circuitry 1012. The head 1004 has an upper opening 1014 (see FIG. 11) and a closure member, such as a cap 1016, secured to the head 1004 to close the upper opening 1014. In one embodiment, the cap 1016 is an overmold made of epoxy or another material selected to form a suitable seal.

The circuitry 1012 includes a sensor circuit board 1020 having a capacitive sensor that interacts with a head 1022 of the displacement pin 1010. When the stud 1000 is not under tension, the head 1022 may contact a dielectric-coated electrode of the sensor circuit board 1020. When the stud 1000 is placed in tension, the head 1022 may shift away from the electrode of the sensor circuit board 1020.

The circuitry 1012 further includes a power source, such as a battery 1024. In one embodiment, the battery 1024 includes one or more coin cells. The circuitry 1012 further includes a data transfer circuit board 1026 that includes communication circuitry. The battery 1024 is sandwiched between the sensor circuit board 1020 and the data transfer circuit board 1026. The sensor circuit board 1020 and the data transfer circuit board 1026 have one or more electrical contacts that form a circuit with the battery 1024 and permit the battery 1024 to power the sensor circuit board 1020 and the data transfer circuit board 1026. In another embodiment, the power source of the stud 1000 may include coils configured to receive electrical power from an inductive power source mounted on the associated vehicle hub.

With reference to FIG. 11, the displacement pin 1010 includes a shaft 1030 having a distal, lower end portion 1032 secured to the stud housing 1002 such as via an epoxy or adhesive 1034. Regarding FIG. 10, with the stud 1000 assembled, the head 1022 of the displacement pin 1010 includes a lower capacitor plate portion 1040 adjacent an upper capacitor plate portion 1042 of the sensor circuit board 1020.

Figure 12:
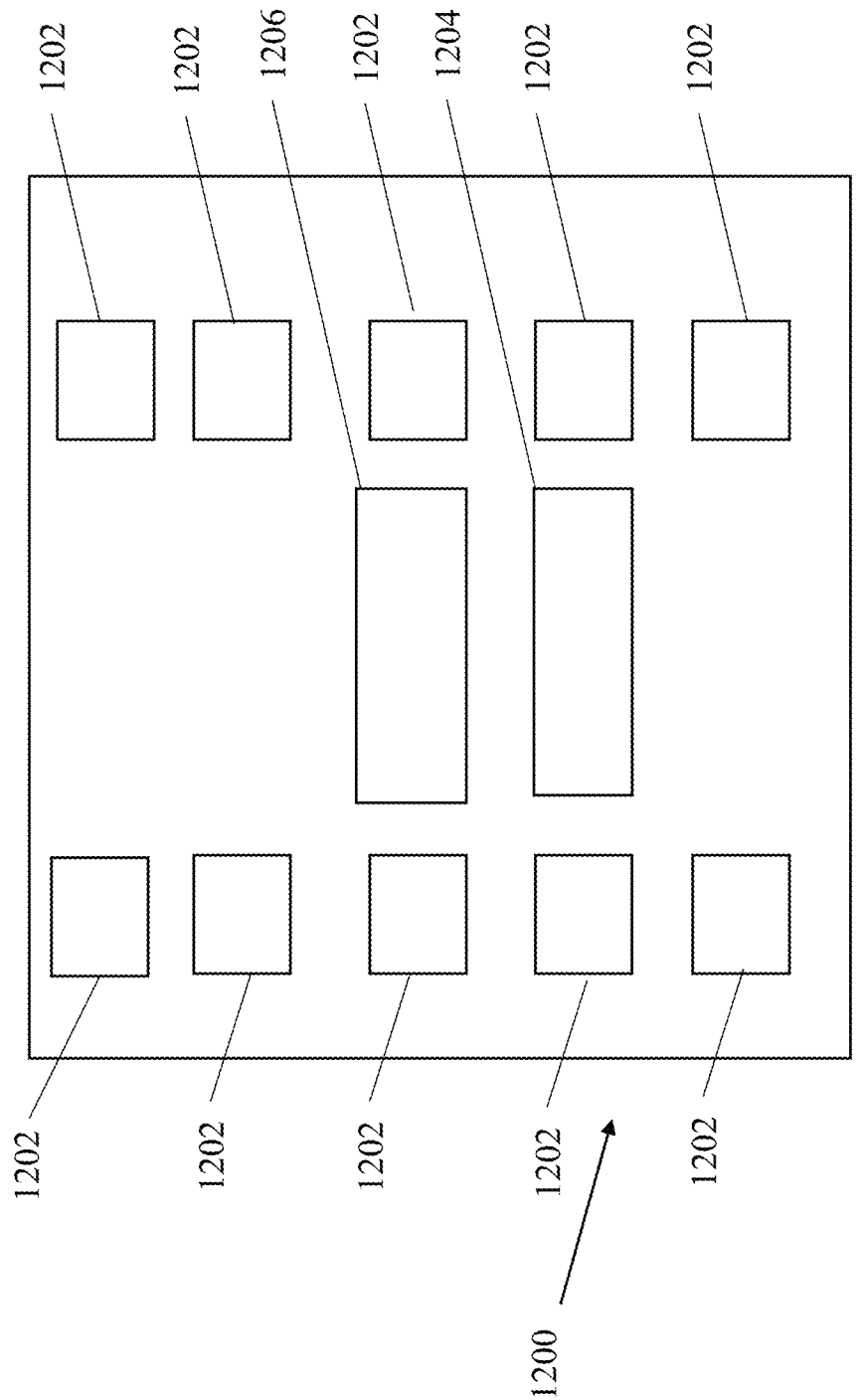
FIG. 12 is a schematic view of a wheel hub having studs each with a sensor to detect tension in the stud, the wheel hub further including a central power source and communication circuitry that provide power to the studs and communicate data from the studs to a device external to the wheel hub.

Regarding FIG. 12, a wheel hub 1200 is provided that includes studs 1202 similar to the studs 103 discussed above. Each stud 1202 includes a sensor configured to detect, for example, tension in the stud 1202. The studs 1202 receive power from a power source 1204, such as a battery, an inductive power source, and/or a solar power source. The wheel hub 1200 includes communication circuitry 1206 configured to communicate data from the studs 1202 to a device external to the wheel hub 1200 such as a gateway mounted on the vehicle. The communication circuitry 1206 may include a processor that performs pre-processing on the data before the data is communicated to the external device. In some embodiments, the wheel hub 1200 includes a processor operably coupled to the communication circuitry 1206 and the studs 1202, the processor performing operations on signals from the studs 1202 and operating the communication circuitry 1206. In some embodiments, the communication circuitry 1206 may be capable of receiving communications from the gateway.

Figure 13:
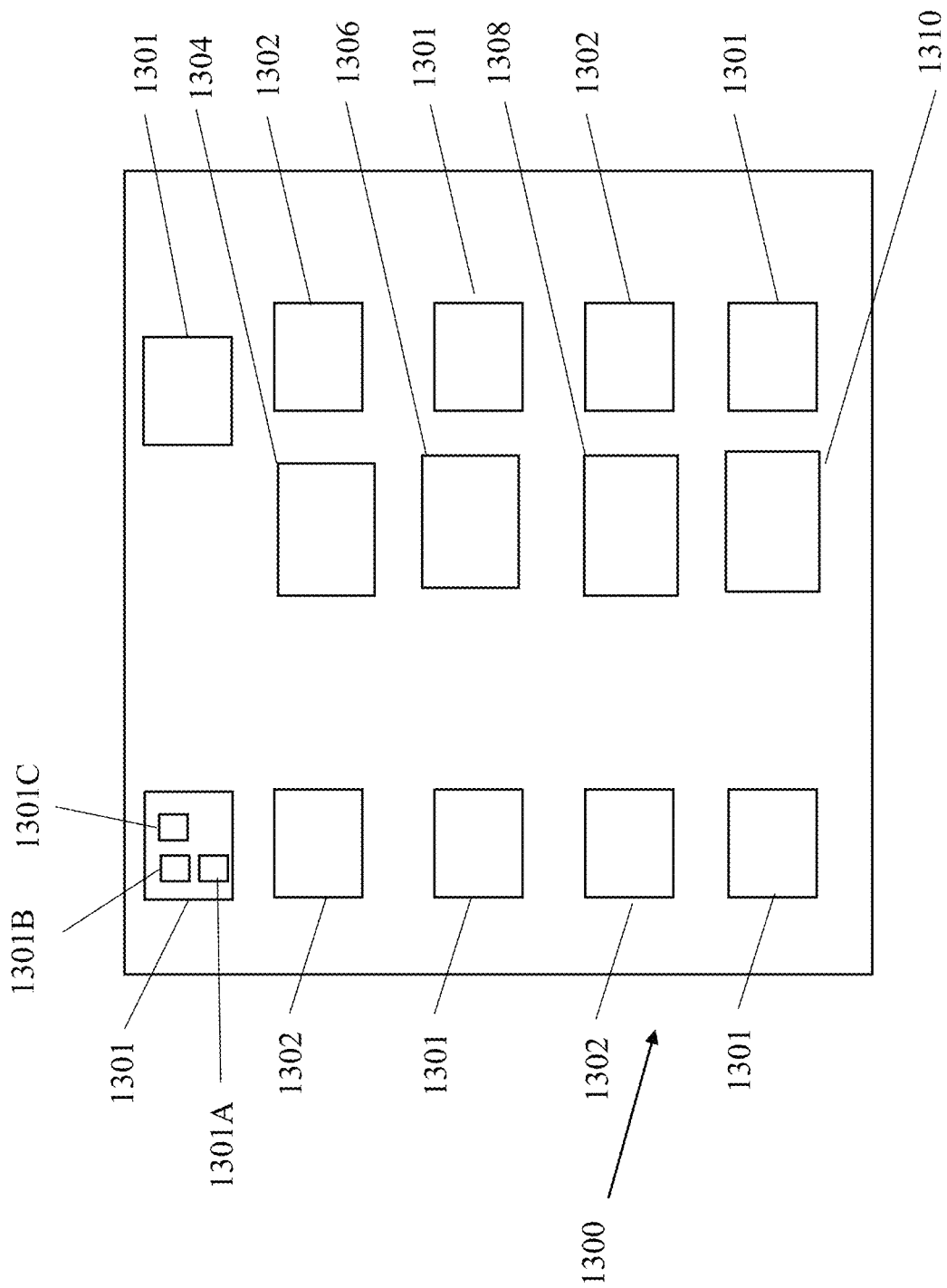
FIG. 13 is a schematic view of a wheel hub having a studs with sensors and studs without sensors.

Regarding FIG. 13, a wheel hub 1300 is provided that includes studs 1301 each having a sensor 1301A, communication circuitry 1301B, and an integral power source 1301C such as battery. The wheel hub 1300 further includes conventional studs 1301. The wheel hub 1300 includes a power source 1304. In one embodiment, the power source 1304 includes a non-rechargeable battery. In another embodiment the power source 1304 that harvests energy from the rotation of the wheel hub 1300 and provides electrical energy to a battery of the power source 1304. The wheel hub 1300 includes a processor 1306 in communication with one or more peripheral sensors 1308 of the wheel hub 1300 such as a temperature, vibration, speed, and/or acceleration. The wheel hub 1300 further includes central communication circuitry 1310 that is operably coupled to the power source 1304 and the processor 1306. The central communication circuitry 1310 may receive wireless communications from the communication circuitry 1301B of the studs 1301 and the processor 1306 controls the communication circuitry 1310 to communicate data from the studs 1301 wirelessly to an external device, such as a vehicle gateway. The central communication circuitry 1310 may thereby operate as a powered repeater that utilizes harvested electrical power such that the signal strength utilized by the communication circuitry 1301B of the studs 1301 may be minimized to maximize the lifespan of the battery of the power sources 1301C of the studs 1301.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A wheel end monitoring apparatus for a vehicle, the wheel end monitoring apparatus comprising:
   a wheel hub configured to receive a wheel rim and be clamped therewith;
   a stud and a nut of the wheel hub, the nut operable to threadingly engage the stud and clamp the wheel hub and wheel rim together which elongates the stud;
   an internal compartment of the stud;
   a power source, at least one sensor, and communication circuitry that are operably coupled;
   wherein the power source, at least one sensor, and communication circuitry are rotatable with the clamped wheel hub and wheel rim;
   wherein the stud includes a displacement member in the internal compartment;
   wherein the at least one sensor includes a first sensor in the internal compartment of the stud, the first sensor configured to detect a distance in the internal compartment between the first sensor and the displacement member;
   wherein the distance in the internal compartment between the first sensor and the displacement member increases with elongation of the stud;
   the at least one sensor configured to detect at least one property of the clamped wheel hub and the wheel rim based at least in part upon the distance between the first sensor and the distance member in the internal compartment, the at least one property indicative of the clamping of the clamped wheel hub and the wheel rim; and
   the communication circuitry configured to wirelessly communicate data associated with the at least one property to an external device.

2. The wheel end monitoring apparatus of claim 1 wherein the studs and the at least one sensor is configured to detect at least one of: stud stress, stud strain, stud length, and nut torque.

3. The wheel end monitoring apparatus of claim 1 wherein the power source, the at least one sensor, and the communication circuitry are embedded in the wheel hub.

4. The wheel end monitoring apparatus of claim 3 wherein the stud comprises a plurality of studs and the nut comprises a plurality of nuts; and
   wherein the power source, the at least one sensor, and the communication circuitry are embedded in at least one of the studs.

5. The wheel end monitoring apparatus of claim 1 further comprising a processor configured to utilize the at least one property of the clamped wheel hub and wheel rim components to determine at least one of:
   a failure mechanism of one or more of the wheel hub and wheel rim;
   an under-tensioned or over-tensioned fastener of the wheel hub;
   an elongation of one or more components of the wheel hub that exceeds a threshold;
   a stress in one or more components of the wheel hub that exceeds an upper threshold or is less than a lower threshold;
   a stress in one or more components of the wheel rim that exceeds an upper threshold or is less than a lower threshold and
   a pattern of stress in one or more of the wheel hub and wheel rim components that corresponds to a predetermined pattern.

6. The wheel end monitoring apparatus of claim 1 wherein the power source is configured to harvest energy from rotation of the wheel hub.

7. The wheel end monitoring apparatus of claim 1 wherein the first sensor includes a capacitive sensor, the at least one sensor configured to detect the at least one property of the clamped wheel hub and wheel rim based on a measured capacitance.

8. The wheel end monitoring apparatus of claim 1 further comprising at least one processor operably coupled to the at least one sensor, power source, and communication circuitry, the at least one processor rotatable with the clamped wheel hub and wheel rim;
   the at least one processor configured to receive a signal from the at least one sensor and determine the at least one property based upon the signal received from the at least one sensor.

9. The wheel end monitoring apparatus of claim 8 wherein the at least one processor is configured to monitor the at least one property and cause the communication circuitry to wirelessly communicate the at least one property to the external device upon the at least one property having a predetermined relationship with at least one threshold.

10. The wheel end monitoring apparatus of claim 1 wherein the power source includes at least one battery configured to rotate with the clamped wheel hub and wheel rim.

11. The wheel end monitoring apparatus of claim 1 further comprising the external device, wherein the external device includes a gateway configured to receive electrical power from an electrical system of the vehicle, the gateway configured to communicate with the communication circuitry using a short-range wireless protocol and to communicate the data to a cloud-based computing system via a wide area wireless network.

12. The wheel end monitoring apparatus of claim 1 further comprising a processor configured to communicate an alert in response to the at least one property of the clamped wheel hub and wheel rim being at least one of: greater than an upper threshold, less than a lower threshold, and outside of a predetermined range.

13. The wheel end monitoring apparatus of claim 1 wherein the sensor comprises the first sensor and a second sensor, the second sensor outside of the internal compartment of the stud.

14. The wheel end monitoring apparatus of claim 1 wherein the stud has an initial configuration with an initial length and a tensioned configuration wherein the stud has a length longer than the initial length; and
    wherein the displacement member contacts the first sensor with the stud in the initial configuration.

15. The wheel end monitoring apparatus of claim 1 wherein the stud comprises a stud housing that includes the internal compartment; and
    wherein the displacement member is assembled with the stud housing.

16. The wheel end monitoring apparatus of claim 1 wherein the internal compartment of the stud has a closed end; and
    wherein the displacement member extends from the closed end toward the first sensor.

17. The wheel end monitoring apparatus of claim 1 wherein the first sensor includes a capacitive sensor configured to convert a measured capacitance to a signal indicative of the distance between the capacitive sensor and the displacement member.

18. A wheel end monitoring apparatus for a vehicle, the wheel end monitoring apparatus comprising:
    a wheel hub having a mounting portion;
    a plurality of studs of the wheel hub projecting from the mounting portion to mount a wheel rim to the wheel hub;
    a plurality of nuts of the wheel hub configured to threadingly engage the studs and clamp the wheel rim and wheel hub mounting portion together;
    a power source of the wheel hub and rotatable therewith;
    a plurality of sensors of the studs operably coupled to the power source, the sensors configured to detect at least one property of the studs indicative of the clamping of the wheel rim and wheel hub; and
    communication circuitry of the wheel hub operably coupled to the power source and sensors, the communication circuitry configured to communicate data associated with the at least one property to an external device;
    wherein each of the studs comprises:
        a head portion;
        a shank portion configured to elongate upon tensioning of the stud;
        an internal compartment; and
        a displacement member in the internal compartment, the displacement member shifting relative to the head portion upon tensioning of the stud;
    wherein the sensors include a capacitive sensor of each of the studs, the capacitive sensor in the internal compartment of the stud and configured to detect a capacitance between the capacitive sensor and the displacement member, the capacitance changing as the displacement member shifts with tensioning of the stud.

19. The wheel end monitoring apparatus of claim 18 wherein the mounting portion includes a flange; and
    wherein the head portions of the studs are secured to the flange and shank portions of the studs project from the flange.

20. The wheel end monitoring apparatus of claim 19 wherein the capacitive sensors are in the stud head portions, the capacitive sensors detecting the at least one property based upon capacitance between the capacitive sensors and the displacement members.

21. The wheel end monitoring apparatus of claim 18 wherein the power source includes batteries in the internal compartments;
    wherein the sensors include transducers in the internal compartments;
    wherein the communication circuitry includes communication circuitry in the internal compartments.

22. The wheel end monitoring apparatus of claim 18 wherein the communication circuitry includes communication circuitry in the internal compartments configured to wirelessly communicate the data associated with the at least one property of the studs to the external device.

23. The wheel end monitoring apparatus of claim 18 further comprising a processor configured to determine, using the at least one property, at least one of:
    a yielded stud;
    an over-tensioned stud; and
    an under-tensioned stud.

24. The wheel end monitoring apparatus of claim 18 further comprising the external device, the external device including a gateway configured to be mounted to the vehicle and receive electrical power from an electrical system of the vehicle; and
    wherein the gateway comprises communication circuitry configured to communicate, via a wide area wireless network, the at least one property of the at least one fastener to a cloud-based computing system.

25. The wheel end monitoring apparatus of claim 18 wherein the at least one property includes at least one of tension, length, strain, and stress of the fasteners studs.

26. The wheel end monitoring apparatus of claim 18 wherein the capacitive sensor includes an upper capacitor plate portion and the displacement member includes a lower capacitor plate portion.

27. A method of monitoring wheel end components of a vehicle, the wheel end components comprising a wheel hub and a wheel rim that are clamped together, the method comprising:
    powering at least one sensor associated with the wheel end components with a power source, the at least one sensor and the power source rotatable with the wheel end components, the at least one sensor including a first sensor in an internal compartment of a stud of the wheel hub;

detecting a distance between the first sensor and a displacement member in the internal compartment of the stud;

detecting, via the at least one sensor, at least one property indicative of clamping between the wheel hub and wheel rim based at least in part upon the distance between the first sensor and the displacement member in the internal compartment of the stud; and wirelessly communicating, via communication circuitry associated with the wheel end components and rotatable therewith, data associated with the at least one property to at least one external device.

28. The method of claim 27 further comprising facilitating determination by a remote computer a current failure mechanism of the wheel end components, a predicted failure mechanism of the wheel end components, or a combination thereof.

29. The method of claim 27 further comprising determining, by a processor utilizing the at least one property, at least one of:

a yielded fastener;

an over-tensioned fastener; and an under-tensioned fastener.

30. The method of claim 27 wherein the at least one property includes at least one of: stress, strain, torque, and a dimension.

31. The method of claim 27 wherein the first sensor includes a capacitive sensor; and detecting the at least one property includes detecting the at least one property based upon a capacitance measured by the capacitive sensor.

32. The method of claim 27 wherein the detecting includes detecting the at least one property while the wheel end components rotate and the at least one sensor and communication circuitry rotate with the wheel end components; and wherein communicating the data associated with the at least one property to the at least one external device includes communicating the at least one property to a gateway of the vehicle.

* * * * *